United States Patent [19]

Chen et al.

[11] Patent Number: 5,330,840
[45] Date of Patent: Jul. 19, 1994

[54] POLYSILOXANE CONTAINING POLYURETHANE AND COATED ARTICLES USEFUL AS TONER FUSING MEMBERS

[75] Inventors: Jiann H. Chen, Fairport; Tsang J. Chen; Lawrence P. DeMejo, both of Rochester, all of N.Y.

[73] Assignee: Eastman Kodak Company, Rochester, N.Y.

[21] Appl. No.: 102,864

[22] Filed: Aug. 6, 1993

Related U.S. Application Data

[63] Continuation-in-part of Ser. No. 890,502, May 28, 1992, abandoned.

[51] Int. Cl.$^5$ ............................................. B32B 27/40
[52] U.S. Cl. ........................... 428/423.1; 428/423.5; 428/447; 528/28; 525/456; 525/520; 525/474
[58] Field of Search ............... 525/456, 520, 474; 528/28; 428/423.1, 423.5, 447

[56] References Cited

U.S. PATENT DOCUMENTS

| | | | |
|---|---|---|---|
| 3,243,475 | 3/1966 | Reischl et al. | 528/28 |
| 3,957,724 | 5/1978 | Schurb et al. | 260/46.5 E |
| 4,098,742 | 7/1978 | Mueller | 260/29.2 M |
| 4,130,078 | 12/1978 | Friedlander et al. | 528/28 |
| 4,202,807 | 5/1980 | Moretto et al. | 260/29.1 SB |
| 4,631,320 | 12/1986 | Parekh et al. | 525/452 |
| 4,719,130 | 1/1988 | Shimizu et al. | 427/380 |
| 4,807,341 | 2/1989 | Nielsen et al. | 29/132 |
| 4,830,893 | 5/1989 | Nakamura et al. | 428/35.8 |
| 4,839,443 | 6/1989 | Akutsu et al. | 525/474 |
| 4,902,767 | 2/1990 | Roitman et al. | 528/28 |
| 4,908,208 | 3/1990 | Lee et al. | 424/409 |
| 4,916,199 | 4/1990 | Bandlish et al. | 528/28 |
| 4,956,211 | 9/1990 | Saito | 428/36.5 |

*Primary Examiner*—John C. Bleutge
*Assistant Examiner*—Margaret W. Glass
*Attorney, Agent, or Firm*—Robert Luke Walker

[57] ABSTRACT

Toner fusing members with improved properties are formed with an outer layer comprising a melamine-cured block polyurethane coating composition. Such a $(A-B)_n$ block polyurethane is formed by polycondensation of a diisocyanate, an organopolysiloxane diol and a $C_{2-20}$ diol.

3 Claims, No Drawings

POLYSILOXANE CONTAINING POLYURETHANE AND COATED ARTICLES USEFUL AS TONER FUSING MEMBERS

This is a Continuation-In-Part of application Ser. No. 07/890,502, filed May 28, 1992, now abandoned.

FIELD OF THE INVENTION

This invention relates to a polyurethane polymer and, more particularly to a melamine-cured polyurethane coating composition derived from an organopolysiloxane diol. The coating composition is useful in the manufacture of toner fusing members.

BACKGROUND OF THE INVENTION

In certain electrostatographic imaging and recording processes, for instance, in electrophotographic copying processes, an electrostatic latent image formed on a photoconductive surface is developed with a thermoplastic toner powder which is thereafter fused to a substrate. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls. At least one of the rolls is heated and in the case where the fusing member is a heated roll, a smooth resilient surface is bonded either directly or indirectly to the core of the roll. Where the fusing member is in the form of a belt it is preferably a flexible endless belt having a smooth, hardened outer surface which passes around the heated roller. A persistent problem in this operation is the tendency of the toner to adhere not only to the paper but also to the fusing surface which contacts it, when the toner is heated during passage through the rolls. Any toner remaining adhered to the member can cause a false offset image to appear on the next sheet that passes through the rolls and can also degrade the fusing performance of the member. Another problem may occur as a result of continued heating causing degradation of the member which results in an uneven surface and defective patterns in thermally fixed images.

Toner fusing rolls are composed of a cylindrical core which may contain a heat source in its interior, and a covering layer bonded directly or indirectly on the surface of the core. A thin layer of a suitable primer is advantageously coated on the surface of the core in order to improve bonding of the layer. Roll coverings are commonly made of fluorocarbon polymers or silicone polymers, such as poly(dimethylsiloxane) polymers, of low surface energy which minimizes adherence of toner to the roll. Frequently release oils composed of, for example, poly(dimethylsiloxanes) are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a specified finishing surface. The belt substrate can be metallic or polymeric. The surface of the belt is composed of a thinly coated, low surface energy polymer such as a fluorocarbon or a silicone resin. There is a need for coating compositions which adhere strongly to the belt and form a hard, tough surface which is resistant to wear and cracking. The surface should also be resistant to cleaning solvents and fluids.

In electrostatographic imaging processes dry developers can be used to form an image on a receiving surface such as a sheet of paper. Dry developers usually comprise a toner powder and carrier particles. Carrier particles and toner particles have different triboelectric values. As the developer mixture is agitated the particles rub together and the toner and carrier particles acquire opposite electric charges and cling together. In the subsequent development step the somewhat higher opposite charge of the electrostatic latent image draws the colored toner from the carrier and develops the image. Frequently, various addenda are used to improve the properties of the toner and carrier particles.

Toners comprise, as a major component, the binder, and as minor components a colorant and a charge control agent. The binder can be any resin which has properties suitable for dry toners. Many such resins are known but thermoplastic resins which are fixable by fusing are especially useful. When a dry toner powder image is transferred from one surface to another defects in the image can occur. It is known from U.S. Pat. No. 4,758,491 that by the addition of low surface energy liquid or solid addenda, especially polymers containing organopolysiloxane segments, many of these defects can be alleviated.

Carrier particles comprise magnetizable irregular particles which are usually coated with a film of a polymeric material which helps develop the triboelectric charge and aids the transfer of the toner. The coating material must adhere well to the carrier particle because the toner charge declines as the polymer wears off. Polymers with low surface energy properties are especially useful for coating carrier particles.

Polymers, also, are composed of various types. For example, one type is a block copolymer. Block copolymers are macromolecules comprised of chemically dissimilar, terminally connected segments. Their sequential arrangement can vary from A-B structures, containing two segments only, to A-B-A block copolymers with three segments, to multiblock $-(A-B)-_{n'}$ systems possessing many segments.

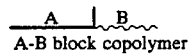
A-B block copolymer

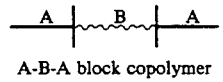
A-B-A block copolymer

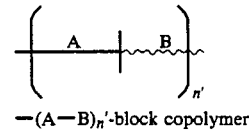
$-(A-B)_{n'}$-block copolymer

See Noshaz et al, Block Copolymers, Academic Press, New York (1977).

SUMMARY OF THE INVENTION

The present invention provides a melamine-cured polyurethane coating composition which is useful in the manufacture of fusing members with improved properties, including increased resistance to solvents and thermal degradation.

The polyurethane of the invention is the polycondensation product of an organopolysiloxane diol of the formula I,

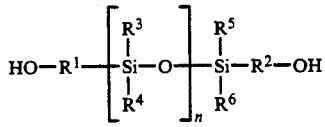

wherein,

R$^1$-R$^2$ are independently C$_{1-6}$ alkylene;
R$^3$-R$^6$ are independently C$_{1-6}$ alkyl, vinyl or phenyl; and
n is 3 to 300;

a C$_{2-20}$ diol and a monomeric diisocyanate of the formula, OCN-D-NCO, wherein D is a hydrocarbon bridging group.

The coated article of the invention, such as a fusing belt, comprises a substrate and coated thereon a composition comprising a crosslinked block copolymer product of a polyurethane block copolymer, as described above, and a melamine resin.

DETAILED DESCRIPTION OF THE INVENTION

The polyurethanes that are used in the practice of this invention are derived from polymeric silicone diols and low molecular weight diols.

The polymeric silicone diols are readily prepared, for example, by ring-opening polymerization of any cyclic monomers which yield disubstituted-siloxane repeating units, with hydroxy functionalized disiloxanes. Suitable cyclic monomers include, for example, octamethylcylotetrasiloxane (known by the abbreviation D$_4$) and octaphenyltetrasiloxane. Suitable hydroxysiloxanes include, for example, 1,3-bis(3-hydroxypropyl)-tetramethyldisiloxane and 1,3-bis(4-hydroxybutyl)-tetramethyldisiloxane. The reaction is illustrated by the following reaction sequence:

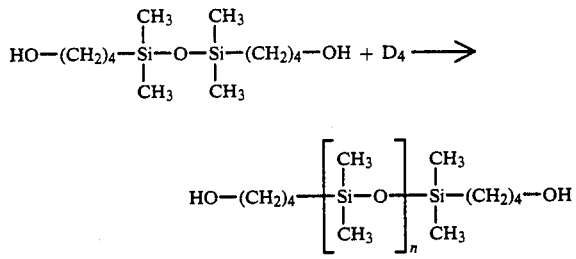

The ring opening reaction may be carried out in the absence of a solvent if the reactants are liquid or in the presence of an inert solvent, for example, toluene and xylene. The polymerization is initiated by a catalyst and conducted at a temperature of, for example, 50°-200° C. Catalysts which are preferred are the so-called transient catalysts, for example, tetramethylammonium siloxanolate and n-butyltricyclohexylphosphonium silanolate which can be removed from the product by vacuum drying.

An alternative route to hydroxyalkyl endcapped organopolysiloxanes involves the direct hydrosilation of unsaturated alcohols in the presence of a platinum catalyst. The reaction is illustrated by the reaction of a polydimethylsiloxane with an alkenyl alcohol by the following reaction sequence;

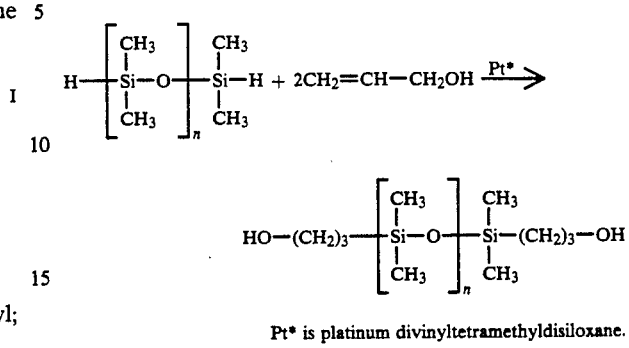

Pt* is platinum divinyltetramethyldisiloxane.

The hydrosilation reaction can be carried out in the presence of a suitable inert solvent, for example, dimethylformamide, tetrahydrofuran, toluene or diglyme. In cases where the reactants are liquid a solvent is not necessary. Suitable catalysts to promote the reaction are, for example, Group VIII metals or derivatives thereof. A particularly suitable metal is platinum, preferably in the form of platinum divinyltetramethyldisiloxane. The reaction may be carried out at a temperature of, for example, from 15°-100° C.

In the organopolysiloxane diol of formula I:

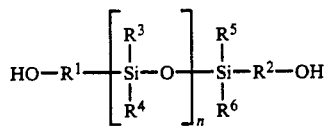

Lower alkylene groups which R$^1$ and R$^2$ represent include methylene, ethylene, propylene, butylene, pentylene, hexylene and 2,2-dimethylpropylene.

Lower alkyl groups which R$^3$-R$^6$ can represent include methyl, ethyl, propyl, isopropyl, butyl, sec-butyl, pentyl and hexyl.

Preferred organopolysiloxane diols are those in which;

R$^1$ and R$^2$ are propylene, butylene or 2,2-dimethylpropylene;
R$^3$-R$^6$ are methyl or phenyl, preferably methyl;
n is 10 to 100;
the diols can range in number-average molecular weight from about 400 to 40,000, preferably 1,000 to 10,000.

These organopolysiloxane diols of relatively high molecular weight which are the base polymers of the invention are advantageously employed as a mixture with low molecular weight diols which comprise up to about 80, and preferably up to about 50 weight percent of the total diol compounds. Low molecular weight C$_{2-20}$ diols having a molecular weight range of about 62-300 are especially useful. Low molecular weight diols of this type are, for example, ethylene glycol, 1,2-propanediol, 1,3-propanediol, 1,2-butanediol, 1,4-butanediol, 1,6-hexanediol, 2,2-dimethyl, 1,3-propanediol, 4,4'-isopropylidenediphenol (known as Bisphenol A), 2,2-bis(4-hydroxyphenyl)hexafluoropropane (known as Bisphenol AF) and mixtures thereof. As illustrated by the representative samples, all the diols contain not more than one ester or one ether group.

The diisocyanates of formula, OCN-D-NCO, which are useful for preparing the polyurethanes of the invention are commercially available or readily prepared by standard methods known in the art. The hydrocarbon bridging groups represented by D include, phenylene, tolylene, hexamethylene, methylene, methylene diphenyl and methylene dicyclohexyl. Exemplary diisocyanates include, 2,4-tolylene diisocyanate, 2,6-tolylene diisocyanate, methylene diisocyanate, methylene bis(4-phenylisocyanate), 1,6-hexamethylene diisocyanate, methylene bis(4-cyclohexyl isocyanate) and mixtures of such monomeric diisocyanates.

The polycondensation reaction to produce the polyurethane of the invention can be carried out in an aprotic solvent, containing not more than traces of water. Suitable solvents include, for example, diethyl ether, tetrahydrofuran, dioxane, diethylene glycol dimethylether, acetone, methyl ethyl ketone, ethyl acetate, dimethylformamide, toluene, tetrachlorethylene and mixtures thereof.

The reaction may be carried out in one step, by mixing the reactants, that is, a polysiloxane diol, a $C_{2-20}$ diol, and one or more monomeric diisocyanates, in stoichiometric ratios with the solvent and a small amount of catalyst. The reaction can be carried out at a temperature of, for example, from 20°-100° C. It is desirable to use a slight excess of the diols to ensure that there are no free isocyanate groups present in the polyurethane product, to form an $-(A-B)_{n'}-$ block copolymer.

hyde and polyfunctional amides and amidines such as urea and melamine. The polyurethanes of the invention, comprising silicone diol blocks, when cured with melamine resins provide coating compositions with properties suitable for use in fusing members.

Melamine resins, such as Cymel-303, -380, and -385, from American Cyanamid, are used as crosslinking agents, generally constituting from 2 to 80 wt. %, preferably 10 to 40 wt. % of the final coating compositions.

The commercially available melamine resins differ principally in the number of methoxymethyl and hydroxymethyl substituents on the melamine amino groups and the degree of polymerization of the resins. The methoxymethyl and hydroxymethyl groups are both capable of acid catalyzed crosslinking with suitable nucleophiles, such as the hydroxyl terminal groups of the polyurethanes of the invention. Cymel-303 melamine resin, with a degree of polymerization of about 1.7, is composed predominantly of monomeric hexamethoxymethyl melamine crosslinked with hydroxyl groups in the presence of a strong acid catalyst. Cymel-380 melamine resin, with a degree of polymerization of about 2.6, contains both hydroxymethyl and methoxymethyl groups and a significant level of polymeric forms and reacts readily with hydroxyl groups in the presence of weak acid catalysts. Cymel-385 melamine resin, with a degree of polymerization of about 2.1, and a high proportion of hydroxymethyl groups is a very reactive curing agent under mild acidic conditions. By

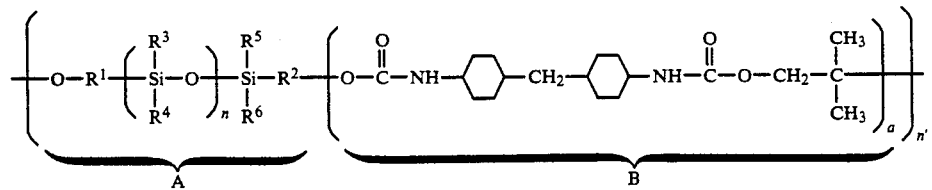

Catalysts which can be used include, tertiary amines, for example, pyridine or triethylamine; alkali hydroxides, for example sodium or potassium hydroxide; alkali alcoholates, for example, sodium methoxide; and organic tin compounds, for example, tin octanoate, tin laurate and tin acetate.

Preferred polyurethane block copolymers of the invention are those wherein the polyurethane comprises 25-60 weight percent, preferably 30-50 weight percent of polymeric diols; the polyurethane has a number-average molecular weight range of 5,000 to 500,000, preferably 10,000 to 100,000; the polyurethane consists essentially of 30-50 weight percent of polydimethylsiloxane blocks; the polyurethane is derived from methylene bis(4-cyclohexyl isocyanate).

The polyurethane block copolymers described above are soluble in polar organic solvents, for example, chlorinated solvents such as methylene chloride, and tetrahydrofuran. They are therefore suitable for solution coating processes, especially when mixed with a crosslinking agent and subjected to curing conditions on a coated article.

The polyurethane copolymers described above contain reactive sites suitable for condensation with crosslinking agents. The reactive sites are predominantly hydroxyl groups located on the endcapping diol units. Crosslinking agents which can be used and which are especially useful in the preparation of surface coatings are the amino resins. The term "amino resins" is normally applied to the condensation products of formaldehyde and polyfunctional amides and amidines such as degree of polymerization is meant, the average number of triazine units per molecule.

In accordance with the present invention, the coated article can be a fusing member in the form of a roll, belt or any surface having a suitable configuration for fixing or fusing a thermoplastic toner image to a substrate such as a paper sheet.

When the fusing member is in the form of a belt which passes around a heated resilient or hard roller the belt comprises a substrate having a thin, hard outer coating. The backup pressure roller has an overcoat which is sufficiently compliant that, in combination with the coated belt, a compliant surface is presented to an image carrying receiver sheet.

A coated fusing belt of the invention comprises a continuous flexible substrate having a surface covering of a melamine-cured polyurethane of the invention. The coated fusing belt is fabricated by first preparing a solution to be used to form the coating. The solution comprises a solvent, for example, tetrahydrofuran, the polyurethane of choice, a melamine resin and a catalyst useful for crosslinking of the diol terminated polyurethane with the melamine resin's reactive groups. The solution contains, for example, 10-30 weight percent of the polyurethane and 2-10 weight percent of the melamine resin. The coating solution is applied to the belt substrate by well known techniques such as blade application or ring coating to give a 2-20 micron thick layer.

Curing is accomplished in about 3 hrs. to 30 min., at temperatures from about 100° to 250° C., using an acid catalyst, such as trifluoroacetic acid, at about 0.001% to 1.0% with respect to total solids in the formulations. In a preferred embodiment curing is accomplished by heating at about 150°-160° C. for one hour.

The polyurethanes of the invention have the advantage that they are readily soluble in polar solvents used in solution coating techniques which allows thin surface coatings to be formed on fusing members. The melamine-cured, thermoset resins of the invention provide hard, tough, low surface energy coatings for such fusing members and have the advantages of excellent thermal stability, good releasing properties, resistance to cleaning solvents and swelling by release oils, and resistance to abrasion and delamination. Fusing members can be coated with a thin, hardened surface which resists wear and cracking and resists the tendency of toner to become embedded on the surface. Their superior resistance to swelling by release oils results in a reduction or elimination of step patterns in electrophotographic copies.

The polyurethane block copolymers and coating compositions of the invention having the properties described above can also be advantageously used as low surface energy addenda for toners and toner carrier particles.

Cured coatings of the invention, on stainless steel shims or copper foils at dry thickness of about 0.5 micron to 50 microns, have exhibited good adhesion to the substrates with excellent resistance against common organic solvents, such as acetone and toluene. In addition, when evaluated as image-fixing media, the coatings have shown desirable release properties with low or no off-settings under simulated fusing conditions, as indicated in examples hereinafter.

EXAMPLES

The following examples illustrate the preparations of silicone-diols, polyurethanes, as well as coating, curing and testing of metal strips under simulated image-fixing conditions.

Preparation of Silicone Diols, Endcapped With Omega-Hydroxyalkyl Groups

Example 1

Octamethylcyclotetrasiloxane (200 g), 1,3-bis(4-hydroxybutyl)-tetramethyldisiloxane (27.8 g) and tetramethylammonium siloxanolate (1 g) were mixed, heated and stirred gently under nitrogen in an oil bath at 100° C. overnight.

The reaction mixture was then further heated to 150° C. for 2 hours to deactivate the catalyst, and subsequently heated to 175° C. for 3 hours under vacuum to strip off the unreacted reagents. The residual material afforded the desired polydimethylsiloxane diol with 4-hydroxybutyl end groups, having a number-average molecular weight of about 3,500, yield=80-90%.

Preparation of Polyurethanes from Silicone Diols

Example 2

The polymeric silicone diol (20 g) as obtained from Example 1,2,2-dimethyl-1,3-propane diol (3.42 g) and tin octanoate (0.5 g) were dissolved in tetrahydrofuran (80 ml) under nitrogen. The reaction mixture was heated to 60° C. then methylene bis(4-cyclohexyl isocyanate) (10 g) was added dropwise from an addition funnel during 2 hours. An additional 1 g of the diisocyanate was slowly added and stirring was continued at 60° C. until a build-up in viscosity was observed. The solution was cooled to ambient temperature and then poured into water to recover the polymer. After washing and drying in a vacuum oven overnight the desired polyurethane was obtained, yield=90%. The percent weight of polydimethylsiloxane blocks (PDMS) is approximately 60%.

By following essentially the same procedure as described for Example 2 and substituting other short-chain diols for 2,2-dimethyl-1,3-propane diol the following polyurethanes were obtained:

| Example | Short-Chain Diol | Weight % PDMS Blocks |
|---|---|---|
| 3 | 1,4-Butanediol | 25 |
| 4 | 1,4-Butanediol | 40 |
| 5 | 2,2-Dimethyl-1,3-Propanediol | 60 |
| 6 | Bisphenol AF | 40 |
| 7 | 2,2-Dimethyl-1,3-Propanediol | 40 |

Coating and Curing of Silicone Modified Polyurethanes

Example 8

A polyurethane containing 60% by weight of PDMS units as obtained from Example 5 above was formulated with 20 weight percent of the melamine resin (Cymel 380 obtained from American Cyanamid) in the presence of trifluoroacetic acid (0.5%). A 20 wt. % solution of the formulation in tetrahydrofuran was prepared and coated on 2 mil stainless steel shim. After drying, the coating was cured at 150° C. for 80 min. in air to produce a clear, flexible and tough film with good adhesion to the substrate.

Example 9

By following essentially the same procedure as described for Example 8 and substituting the polymer of Example 7 for the polymer of Example 5, using 20 weight percent of Cymel 380 melamine resin as the crosslinking agent and curing at 160° C. for 60 min., a coating was obtained which had a high gloss, good flexibility, and good adhesion to the metal surface.

Example 10

By following essentially the same procedure as described for Example 8 but increasing the weight percent of Cymel 380 melamine resin to 30% and curing at 160° C. for 60 min., a coating was obtained which had a high gloss, good flexibility, and good adhesion to the metal surface.

Fusing Release Evaluation

The coatings prepared from the polyurethanes of Examples 4, 5, 6 and 7 and Cymel 380 melamine resin were coated on stainless steel shims. The coatings were mounted on a test roller to evaluate their release properties under simulated fusing conditions. A branched polyester color image on laser print paper released from the Examples 4, 5, 6 and 7 coatings, while an uncoated stainless steel strip failed to release under the following fusing conditions:

Fusing Temperature: 280° F. (approx. 138° C.)
Release Temperature: 120° F. (approx. 49° C.)
Speed: one inch per sec. (approx. 2.5 cm per sec.)
Pressure: 0.5 psig. (approx. 351 Kg/m$^2$)

Pressure Roller: 20 mils. Fluorinated Ethylenepropylene (FEP, supplied by Dupont) over 20 mils. Silicone Elastomer (Silastic J. supplied by Dow Corning Corp.)

Although the invention has been described in detail with particular reference to certain preferred embodiments thereof, it should be appreciated that variations and modifications can be effected within the spirit and scope of the invention.

What is claimed is:

1. A coated article comprising:
 a substrate, and coated thereon a composition comprising a crosslinked 'n' block copolymer product of,
 a polyurethane block copolymer and
 a melamine resin; wherein,
 said polyurethane comprises the polycondensation product of a mixture of reactants comprising:
 about 25 to 60 weight percent based on total weight of said products of an organopolysiloxane diol of the formula I,

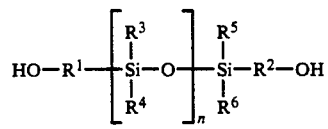

wherein,
 $R^1$ and $R^2$ are independently $C_{1-6}$ alkylene;
 $R^3$–$R^6$ are independently $C_{1-6}$ alkyl or phenyl;
 and
 n is 3 to 300;
 a $C_{2-20}$ diol that contains not more than one ester or one ether group; and
 a monomeric diisocyanate of the formula,

OCN-D-NCO wherein,
 D is a hydrocarbon bridging group.

2. A coated article according to claim 1, wherein said substrate is a belt comprising a continuous flexible substrate.

3. A coated article according to claim 1, wherein said composition contains from 2–80 weight percent of said melamine.

* * * * *

UNITED STATES PATENT AND TRADEMARK OFFICE
CERTIFICATE OF CORRECTION

PATENT NO. : 5,330,840
DATED : July 19, 1994
INVENTOR(S) : Jiann H. Chen, et al

It is certified that error appears in the above-indentified patent and that said Letters Patent is hereby corrected as shown below:

Claim 1, Column 9, line 17 should read: --prising a crosslinked $(A-B)_n$, block copolymer product--

Signed and Sealed this

Sixth Day of December, 1994

Attest:

BRUCE LEHMAN

Attesting Officer

Commissioner of Patents and Trademarks